United States Patent [19]

Stavis

[11] 4,131,891
[45] Dec. 26, 1978

[54] PASSIVE MICROWAVE VELOCITY SENSOR
[75] Inventor: Gus Stavis, Wayne, N.J.
[73] Assignee: The Singer Company, Little Falls, N.J.
[21] Appl. No.: 852,405
[22] Filed: Nov. 17, 1977
[51] Int. Cl.² .............................................. G01S 11/00
[52] U.S. Cl. ............................ 343/112 S; 343/100 ME
[58] Field of Search ................. 343/112 S, 100 ME, 8

[56] References Cited
U.S. PATENT DOCUMENTS

| 3,155,974 | 11/1964 | Seling | 343/112 S X |
| 3,838,424 | 9/1974 | Goldfischer | 343/8 |
| 3,974,500 | 8/1976 | Goldfischer | 343/8 |

Primary Examiner—Maynard R. Wilbur
Assistant Examiner—Richard E. Berger
Attorney, Agent, or Firm—Thomas W. Kennedy

[57] ABSTRACT

A passive microwave velocity sensor uses the natural radiation from the terrain to determine ground velocity independent of altitude. The sensor employs two radiometric interferometers, which analyze inputs from two pairs of receiving antennas aligned along the direction in which velocity is to be sensed. Each pair of receiving antennas has a combined radiation pattern that generates a series of interference fringes along the terrain. Circuitry in each interferometer detects the variation in amplitude of terrain radiation as the antennas pass over the terrain. The frequency of the detected signal is directly proportional to ground velocity divided by altitude. The phase delay in the signals is inversely proportional to altitude. Dividing the frequency by the phase delay yields a signal directly proportional to ground velocity and independent of altitude. By using two triads of receiving antennas and switching between different pairs of antennas in the triads, two radiometric interferometers can be used to generate signals representing along-heading velocity and drift velocity.

13 Claims, 14 Drawing Figures

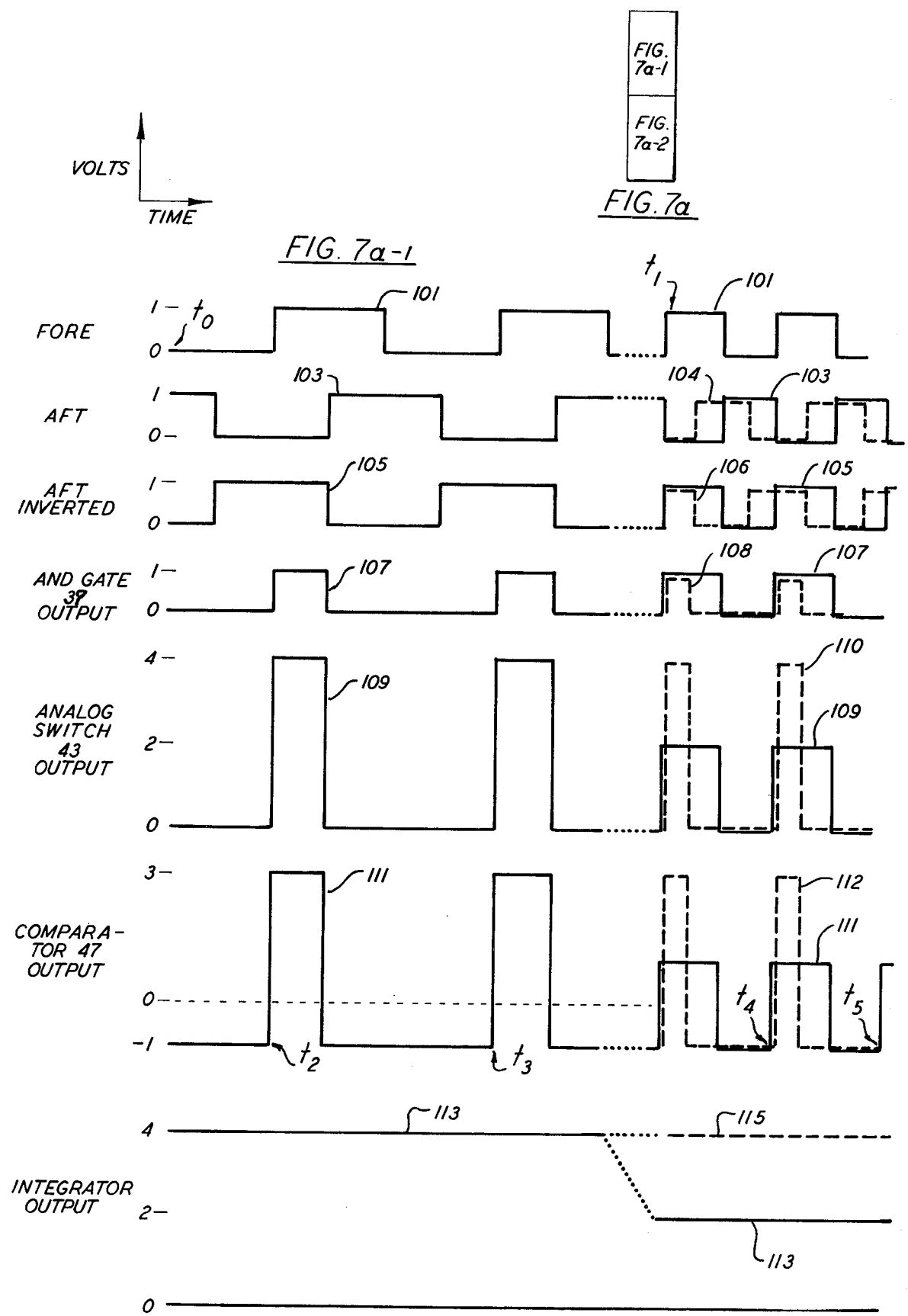

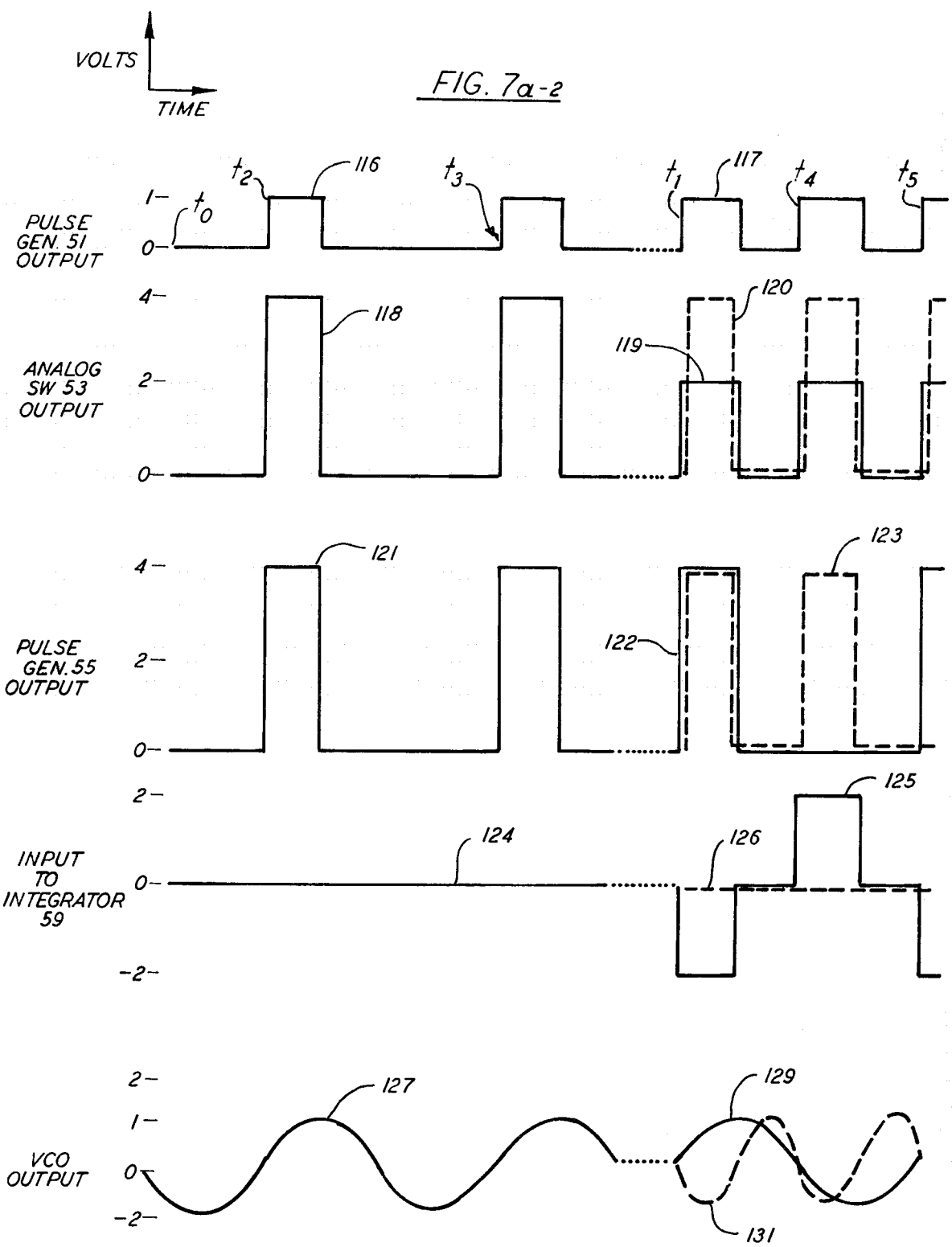

TWO AXIS VELOCITY/ALTITUDE SENSOR

PASSIVE MICROWAVE VELOCITY SENSOR

BACKGROUND OF THE INVENTION

This invention relates to ground velocity detectors in general and more particularly to a ground velocity detector using the natural radiation from terrain.

It is important in aircraft navigation to determine the velocity of the aircraft with respect to the ground. Prior art devices for determining ground velocity include airborne Doppler navigation radar. However, this system involves the transmission of signals by the aircraft. Such transmissions make a military aircraft vulnerable to detection and destruction by enemy defensive systems. Similarly, the prior art includes velocity sensors which use the pattern of back-scattered power from a radiating antenna to determine ground velocity, as disclosed in U.S. Pat. Nos. 3,838,424 and 3,974,500. Like the Doppler system, this system also is vulnerable to defensive countermeasures because of its use of a transmitting antenna.

Prior art systems also include a passive sensor system which used antennas sited in the front and rear of an aircraft to sense natural terrain radiation. The relative time delay in the sensed signals measured the ratio of ground velocity to altitude. However, another method was needed to determine the aircraft's altitude. The use of active radar to measure altitude would make this system as vulnerable to countermeasures as the Doppler system.

SUMMARY OF THE INVENTION

The present invention solves the problems in the prior art by using a passive system to sense ground velocity independent of altitude. Since no transmitting antenna is needed to sense ground velocity or altitude, this system does not betray the aircraft's location and make it vulnerable to attack.

The present invention generates a signal proportional to ground velocity by dividing the output frequency of a radiometric interferometer, which is directly proportional to ground velocity divided by altitude, by the phase difference between two radiometric interferometers, which is inversely proportional to altitude.

Each of the radiometric interferometers analyzes the natural radiation from terrain received by a pair of antennas which are separated by a distance such that their combined radiation pattern would generate a series of interference fringes along the terrain. The two pairs of antennas are spaced apart along the direction in which velocity is to be sensed. Variations in natural radiation from the terrain will cause the sum and difference of the outputs of each pair of antennas to vary periodically. The radiometric interferometer determines the frequency of these variations, which are proportional to the ratio of ground velocity to altitude. The phase difference between the two interferometers is inversely proportional to altitude. By dividing the phase difference by the frequency of the variations, a signal is generated which is proportional to ground velocity and independent of altitude.

By using two triads of antennas and switching between pairs of antennas, signals can be generated which are proportional to along-heading velocity and to drift velocity.

BRIEF DESCRIPTION OF THE DRAWINGS

FIG. 7a illustrates the relationship between FIGS. 7a-1 and 7a-2.

FIG. 7a-1 and 7a-2 show idealized waveforms at several points in the passive microwave velocity sensor of FIG. 7.

DETAILED DESCRIPTION OF THE INVENTION

Figure 1:
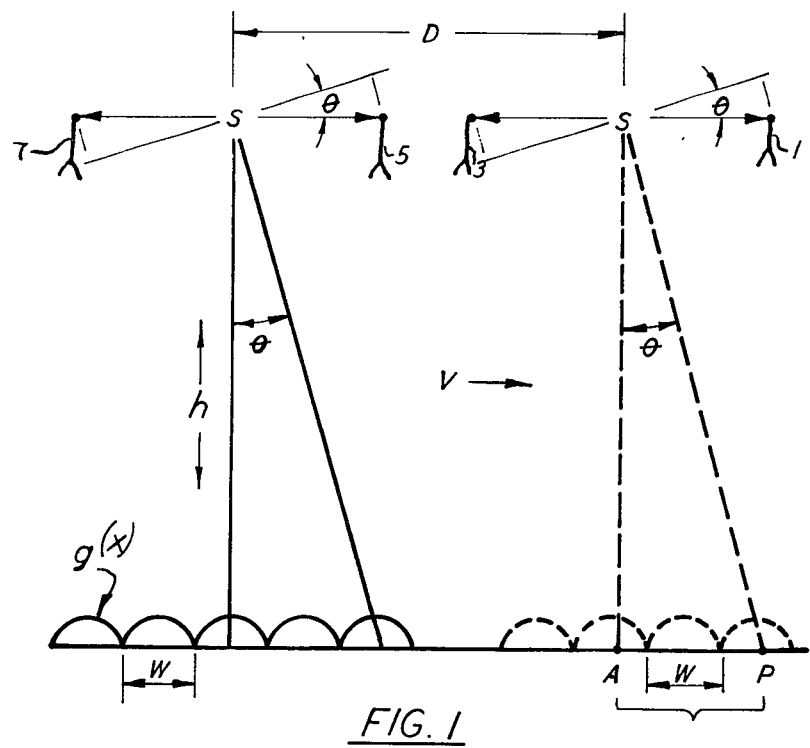
FIG. 1 is a schematic representation of the generation of interference fringes by the radiation patterns of the antennas in two radiometric interferometers.

FIG. 1 schematically illustrates the generation of interference fringes by a pair of antennas 1 and 3 mounted in the front of an aircraft and a pair of antennas 5 and 7 mounted in the rear of the aircraft. Each pair of antennas is separated by a distance S. The aircraft is flying at height h. If antennas 1 and 3 were radiating at wavelength $\lambda$, they would generate a fringe pattern with a spacing W between positive maxima (or minima) of $$W \approx h\lambda/S \tag{1}$$

If antennas 1 and 3 were fed in phase a maximum would exist at point A.

Instead of using antennas 1 and 3 as transmitting antennas, the present invention uses antennas 1 and 3 as receiving antennas. If a point P having radiometric passive emissions is located at a maximum of the fringe pattern, the signals received by antennas 1 and 3 will be in phase. On the other hand, if the point P is located at a minimum of the interference pattern, the signals received by antennas 1 and 3 will be 180° out of phase. Thus as the aircraft flies over the terrain at velocity V, points P which have radiometric passive emissions would cause a frequency f to be received by the antennas, where $$f = V/W \approx VS/h\lambda \tag{2}$$

Equation (1) follows from the fact that the angular directional-sensitivity of antenna pair 1 and 3 is $$f(\theta) = k \cos(\pi s/\lambda \sin \theta)$$

where k is a constant and $\theta$ is the angle ASP in FIG. 1. Since $\theta = \tan^{-1}(x/h)$, where x is the distance from point A to point P in FIG. 1, this equation can be rewritten as $$g(x) = k \cos(\pi S/\lambda \sin(\tan^{-1} x/h))$$

The function $g(x)$ equals zero when $$\pi S/\lambda \sin(\tan^{-1} x/h) = n\pi/2 \text{ or}$$

$$\sin(\tan^{-1} x/h) = n\lambda/2S$$

where n is an odd integer. Thus $g(x)$ is zero where $x/h = \tan(\sin^{-1} n\lambda/2S)$. The separation W between successive nulls (e.g., n=1 and n=3) for small angles ($\theta$ less than 15 degrees) is nearly constant and is approximately equal to $$W = h(\tan(\sin^{-1} 2\lambda/2s) \text{ or}$$

$$W/h = \tan(\sin^{-1} \lambda/s)$$

At small angles $\theta \approx \sin\theta \approx \tan\theta$, and thus $$W/h \approx \lambda/S \text{ and}$$

$$W \approx h\lambda/S \qquad (3)$$

Figure 2:
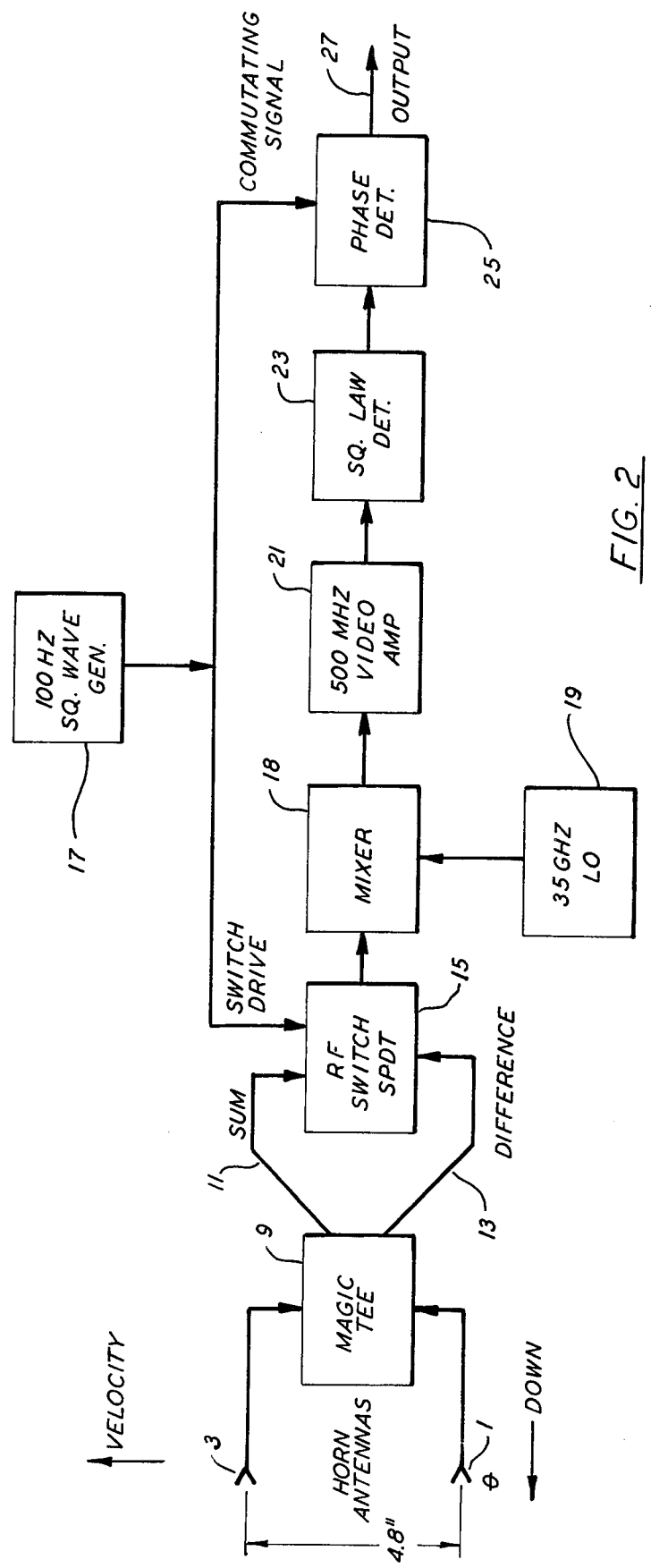
FIG. 2 is a block diagram of the radiometric interferometer.

FIG. 2 is a block diagram of a radiometric interferometer designed to measure the frequency of passive radiometric emissions from terrain as the aircraft flies over the terrain. Signals received by antennas 1 and 3 are fed into magic Tee 9. The sum output 11 and the difference output 13 of magic Tee 9 are connected to terminals of a radio frequency single pole double throw switch 15. The switch 15 is driven by a 100 Hz. square wave generator 17 so that it alternately samples the sum output 11 and the difference output 13 of the magic Tee 9. The output of the switch 15 is mixed in a mixer 18 with the signal from a 35 GHz. local oscillator 19. The mixer output is fed into a 500 MHz video amplifier 21 and then into a square law detector 23 which tracks the envelope of the video carrier. Phase detector 25, which is driven by a commutating signal from square wave generator 17 removes the DC element from the signal and puts the sampled signal from the difference output 13 in phase with the sum output 11. The output 27 of the radiometric interferometer is a signal with a frequency proportional to the ratio of ground velocity to altitude.

Figure 3:
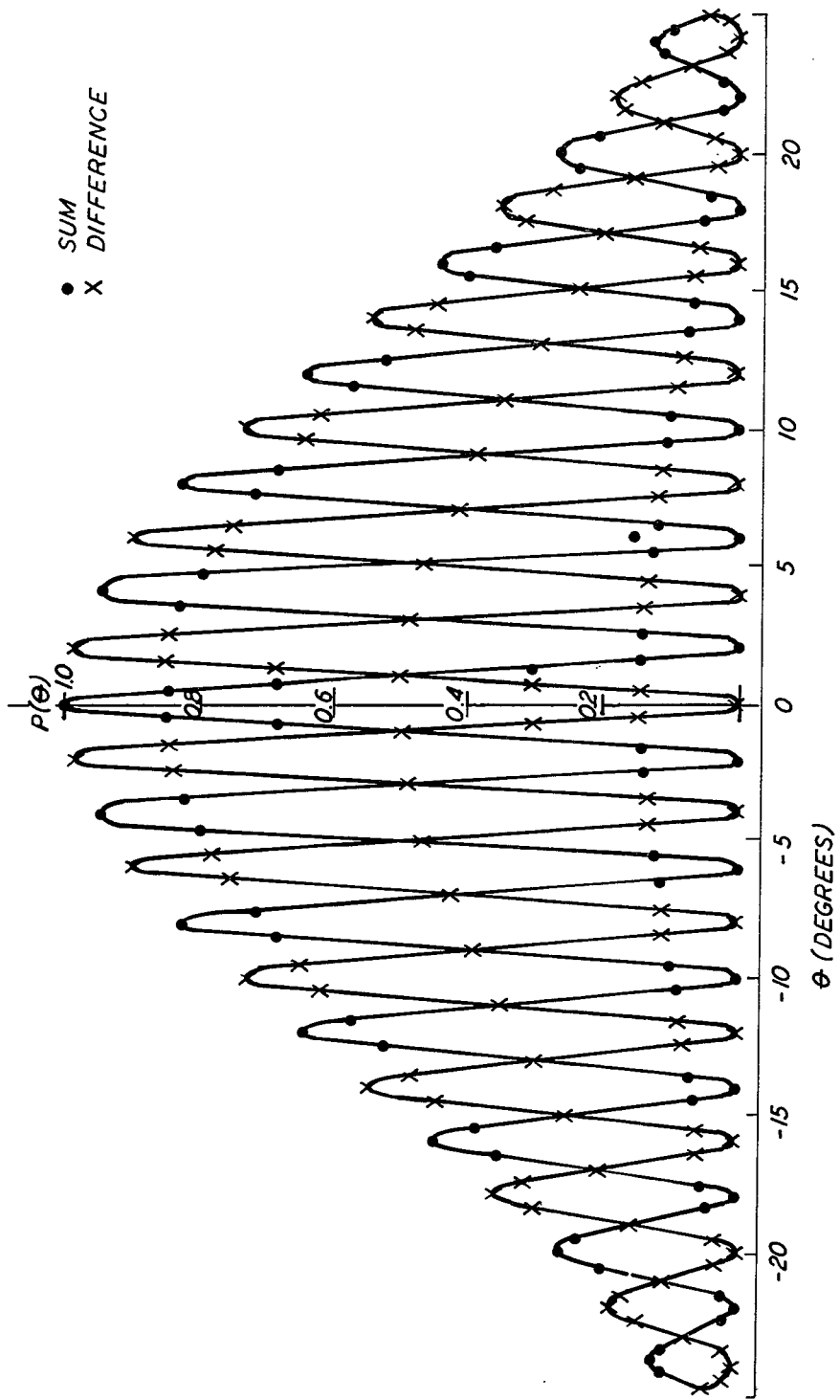
FIG. 3 illustrates the variation in power of the sum and difference of the signals received by one pair of antennas.

FIG. 3 shows the sum and difference patterns for antennas 1 and 3. This figure indicates that the sum and difference patterns and mirror images of each other with respect to their mean value and thus the sum output 11 and the difference output 13 in FIG. 2 will be 180° out of phase with each other.

Figure 4A:
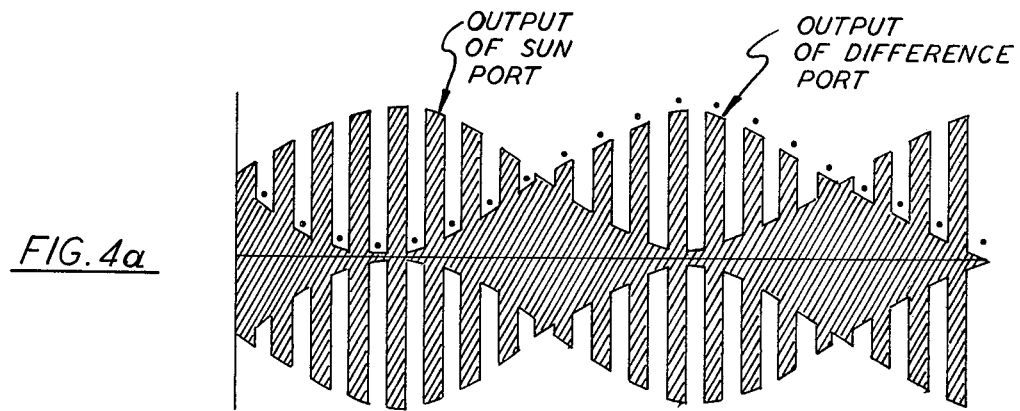
FIGS. 4a–c illustrate idealized waveforms at several points in the radiometric interferometer.
Figure 4B:
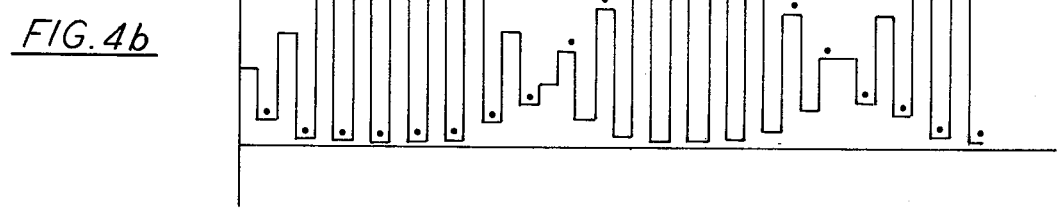
Figure 4C:
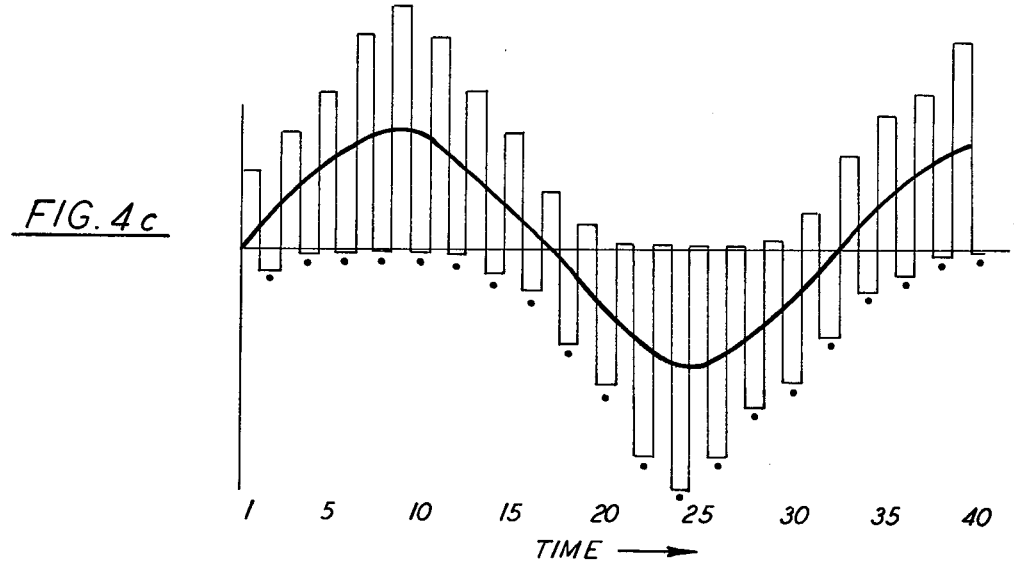

FIGS. 4a-c show idealized waveforms at several points in the interferometer. FIG. 4a shows the waveform of the sum output 11 and the difference output 13 as sampled by switch 15. The dots above certain samples indicate that they were taken from the difference output 13.

FIG. 4b shows the output of the video amplifier 21. Finally, FIG. 4c shows the output 27 of the phase detector 25. The detector 25 alternately reverses the polarity of the signal in step with switch 15. Thus FIG. 4c shows the samples of the difference signal inverted in polarity. This subtracts out the DC value of the signal and causes the difference signal to be in phase with the sum signal, thereby cancelling unwanted common signals and noise, while enhancing the desired signal.

Figure 5:
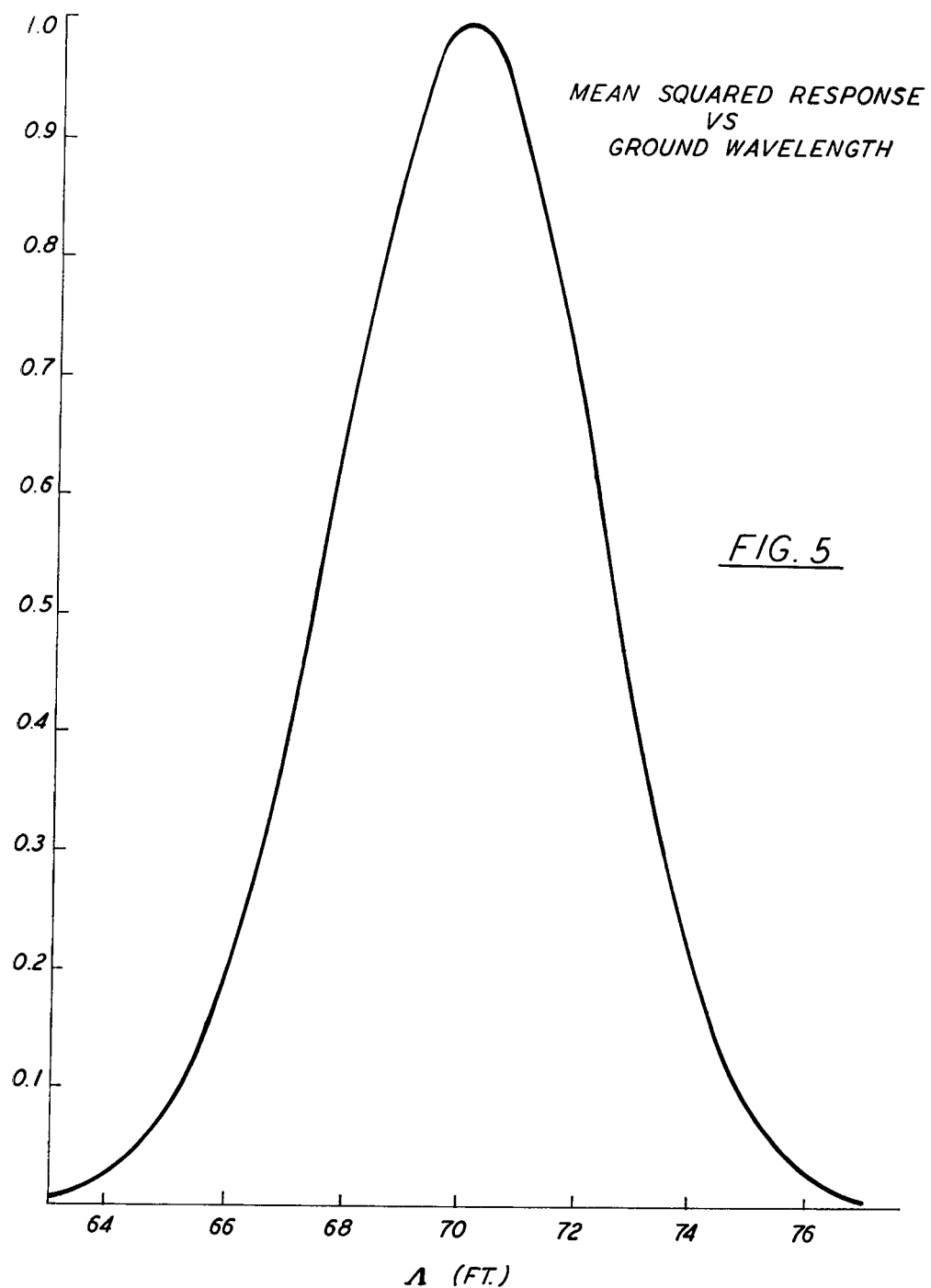
FIG. 5 illustrates the sensitivity of a pair of antennas to variations in natural radiation from terrain.

The effectiveness of the radiometric interferometer depends on variations in natural radiation from terrain. For example, assume that the interferometer of FIG. 2 is mounted on an aircraft traveling at an altitude of 1000 feet, the separation S between the centers of antennas 1 and 3 is 4.8″ and the local oscillator frequency is 35 GHz. From equation (3), the separation between interference fringes is about 70 feet. Thus the interferometer of FIG. 2 will exhibit maximum responses to ground temperature variations with a wavelength of 70 feet. As the aircraft moves over the ground, temperature variations with this wavelength will move into phase with the receiving antennas and 180° out of phase. Ground temperature variations with other wavelengths will not elicit as strong a response from the interferometer. FIG. 5 shows the mean squared response of the interferometer vs ground temperature variation length for a distance between interference fringes of 70 feet.

The radiometric interferometer of FIG. 2 generates a signal with a frequency proportional to the ratio of ground velocity to height. Thus if an aricraft flying at 1000 feet dropped to 500 feet while maintaining the same speed, the frequency of the radiometric interferometer output would double. This occurs because at an altitude of 500 feet the distance between interference maxima is half of the distance between maxima at an altitude of 1000 feet. Thus if a signal can be generated which is inversely proportional to distance between maxima (and hence inversely proportional to height) this signal can be divided into the interferometer output signal to produce a signal which is proportional to ground velocity and independent of height.

A signal proportional to height can be developed by using a second radiometric interferometer connected to a pair of antennas located aft of the antennas connected to the first interferometer. The antennas connected to the second interferometer are spaced apart a distance S which is equal to the distance between the antennas connected to the first interferometer. The second interferometer operates at the same local oscillator and video amplifier frequencies as the first interferometer.

FIG. 1 shows a pair of antennas 5 and 7 spaced apart a distance D from antennas 1 and 3. Since the spacing S between antennas 5 and 7 is the same as the spacing between antennas 1 and 3, the frequency received by antennas 5 and 7 is the same as the frequency received by antennas 1 and 3. However signals received by antennas 5 and 7 will undergo a phase delay of $\chi$, where $$102 = 2\pi D/W = 2\pi DS/h\lambda \qquad (4)$$

The phase delay is proportional to height but independent of ground velocity, and thus can be used in conjunction with the interferometer output frequency to determine ground velocity.

Figure 6:
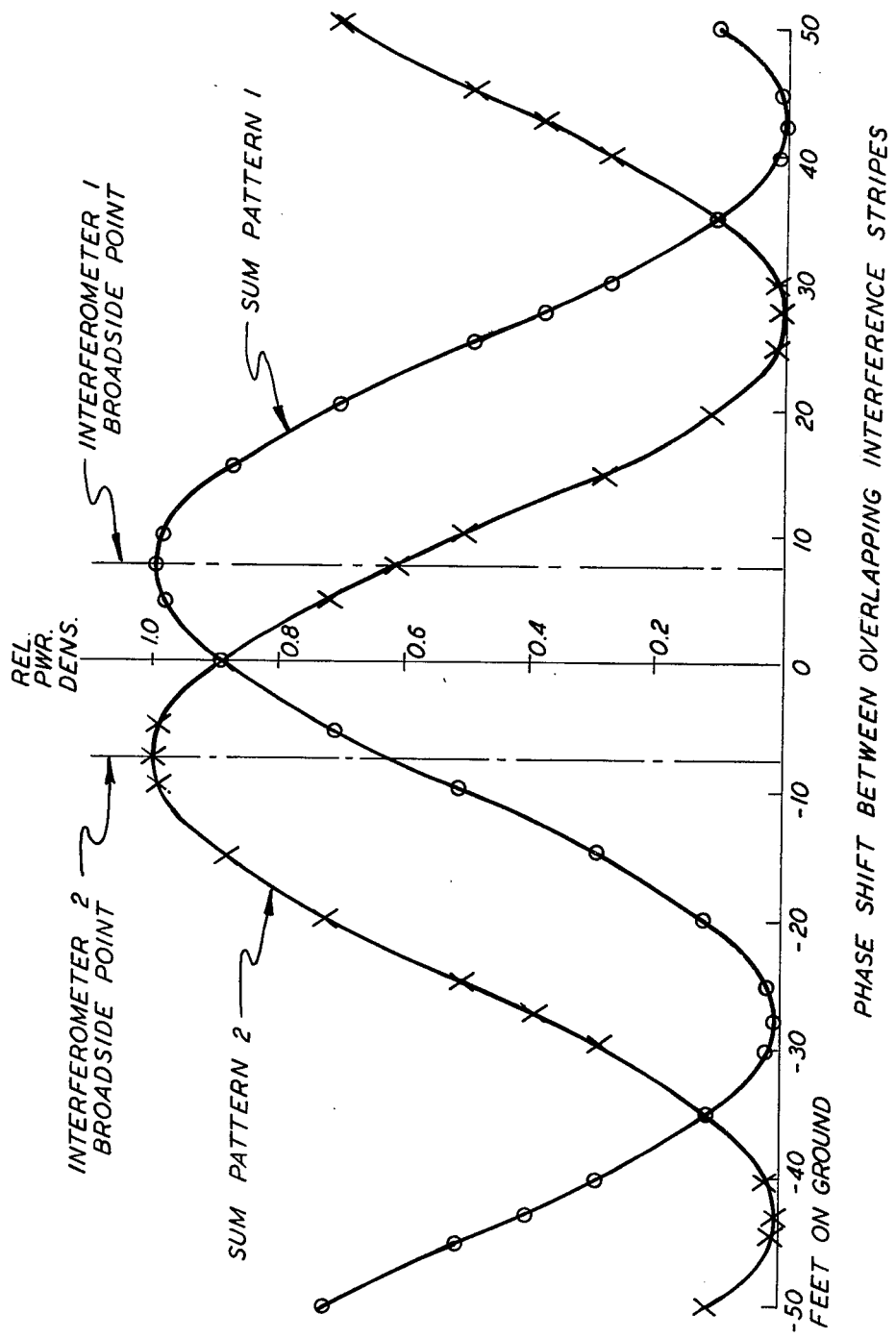
FIG. 6 illustrates the phase shift between signals received by the two radiometric interferometers in the passive microwave velocity sensor.

FIG. 6 illustrates the phase delay between the sum patterns where the antenna pairs are 15 feet apart and the interference stripes are 70 feet apart.

Figure 7:
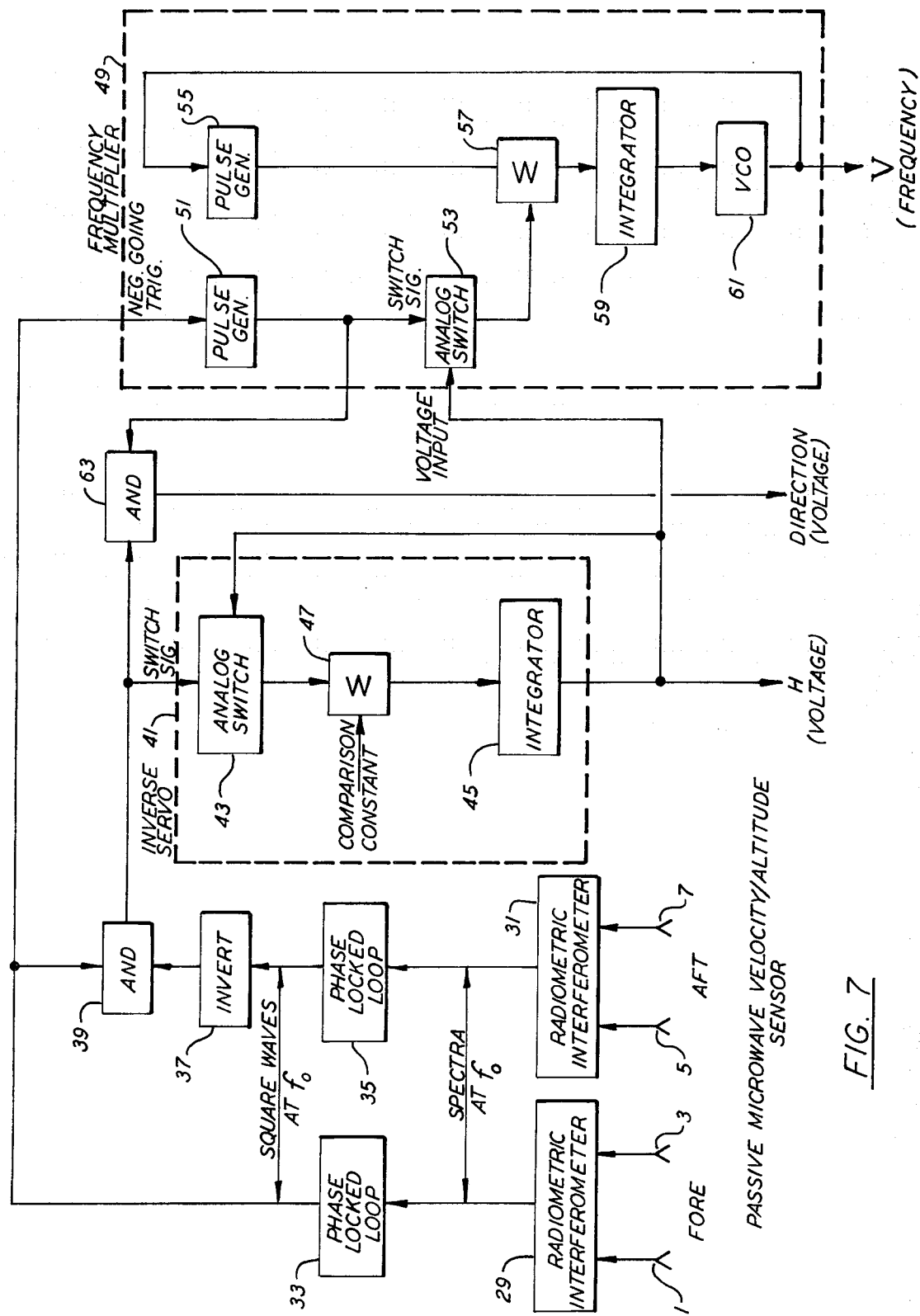
FIG. 7 is a block diagram of a passive microwave velocity sensor using two pairs of antennas to determine ground velocity.

FIG. 7 is a block diagram of a passive microwave velocity sensor which uses two radiometric interferometers 29 and 31. FIGS. 7a-1 and 7-2 illustrate idealized waveforms at several points in the passive microwave velocity sensor of FIG. 7. Antennas 1 and 3 are connected to interferometer 29 and antennas 5 and 7 are connected to interferometer 31. The outputs of the interferometers 29 and 31 are connected to phase-locked loops (PLLs) 33 and 35 which convert the outputs to a square wave of the same frequency. Waveform 101 shows the output of the fore phase-locked loop 33 and waveform 103 shows the output of aft phase-locked loop 35. At the time $t_0$ the aircraft is at 1000 feet altitude with a speed of 100 knots. At time $t_1$ the aircraft is at 500 feet altitude with a speed of 100 knots. At time $t_1$, the frequency of waveforms 101 and 103 has doubled (equation (2)) and the phase delay between 101 and 103 has also doubled (equation (4)). Inverter 37 inverts the output of the aft phase-locked loop 35 to produce waveform 105. The inverted output is combined in an AND gate 39 with the output of the fore phase-locked loop 33 to yield a pulse train 107 with a width proportional to the phase difference between the outputs of the radiometer interferometers 29 and 31. The average voltage of this pulse train is inversely proportional to height (equation (4)). The output pulses of AND gate 39 are inputs to an inverse servo 41. The inverse servo 41 increases the height of the pulses so that their average value equals a preset constant. The output of AND gate 39 is used to control an analog switch 43 which has as an input the output of integrator 45. A circuit 47 subtracts a comparison constant from the analog switch output. The output of circuit 47 is the input of integrator 45, which means that the output of integrator 45 will be driven to a voltage where the average output of circuit 47 is zero. Waveform 109 illustrates the output of analog switch 43 if the output of integrator 45 is 4 volts. Waveform 111 shows the output of circuit 47 if the comparison constant is 1 volt. When the aircraft is at 1000 feet, the average voltage of waveform 111 over a complete cycle (e.g., from $t_2$ to $t_3$) will be 0 when the integrator output value 113 is 4 volts. When the aircraft is at 500 feet the average voltage of waveform 111 over a complete cycle (e.g., from $t_4$ to $t_5$) will be 0 when the integrator output value 113 is 2 volts.

If the aircraft remained at 1000 feet and doubled its velocity, the frequency of the outputs of phase-locked loops 33 and 35 would double but the phase delay would remain the same. Waveform 101 shows the output of the fore phase-locked loop 33 and waveform 104 shows the output of the aft phase-locked loop 35. Waveform 104 is inverted to waveform 106 and combined with waveform 101 in AND gate 39 to yield waveform 108. When the output of analog switch 43 is waveform 110, then the output waveform 112 of circuit 47 will have an average value of 0. For the output of circuit 47 to have an average value of 0, the output value 115 of integrator 45 must be 4 volts. Thus a change in aircraft velocity does not effect the value of the output of integrator 45. The foregoing analysis shows that the output of integrator 45 is a DC voltage which is directly proportional to height and independent of velocity.

The output of integrator 45 is fed into frequency multiplier 49 which generates a signal with a frequency proportional to ground velocity and independent of height. Frequency multiplier 49 contains a pulse generator 51 which generates a series of fixed width, constant amplitude pulses 116 coincident with the ascending or descending transitions of the output 101 of phase-locked loop 33. Since the output of pulse generator 51 has the same frequency as the output of phase-locked loop 33, the mean value of output of pulse generator 51 over a full cycle is proportional to the ratio of ground velocity to height. For example, when aircraft velocity doubles or aircraft height is halved the output of pulse generator 51 would change from waveform 116 to waveform 117 and the mean value of the output would rise from ¼ volt to ½ volt. Analog switch 53 multiplies the output of pulse generator 51 by the output of integrator 45. Multiplying integrator output value 113 by waveform 116 yields switch output waveform 118. If the aircraft height is halved, the integrator output value 113 becomes 2 volts. Multiplying this value by waveform 117 yields waveform 119. Waveform 119 has the same average value (1 volt) as waveform 118. On the other hand, if aircraft velocity doubles, the integrator output value 115 remains 4 volts. The resulting analog switch output waveform 120 has an average value of 2 volts. Thus the average value of the output of analog switch 53 is directly proportional to ground velocity and independent of height.

The next step is conversion of the output of analog switch 53 to an output waveform with a frequency proportional to ground velocity. Pulse generator 55 generates a pulse train of constant amplitude but variable frequency. Circuit 57 subtracts the output of pulse generator 55 from the output of analog switch 53. The output of circuit 57 is fed into integrator 59. The output of integrator 59 drives voltage controlled oscillator (VCO) 61. The output of VCO 61 sets the frequency of pulse generator 55. If the output of analog switch 53 is waveform 118 and the output of pulse generator 55 is waveform 121, then the input to integrator 59 will be 0, since waveform 118 has the same average value as waveform 121. Thus the output of the pulse generator 55 will remain at the same frequency. If the aircraft drops from 1000 feet to 500 feet, the output of analog switch 53 will be waveform 119. Since waveform 119 has the same average value (1 volt) as waveform 118, the output waveform 122 of the pulse generator will remain at the same frequency. Now assume the aircraft doubles its velocity while remaining at the same altitude. The output of analog switch 53 will be waveform 120, which has an average value of 2 volts. The output of integrator 59 will rise until the output frequency of pulse generator 55 doubles, and the resulting output waveform 123 of pulse generator 55 has an average value of 2 volts. Thus the output frequency of VCO 61 will be directly proportional to ground velocity and independent of height.

The velocity sensor can also generate an output with a polarity that indicates the direction of ground velocity. Such an output would be useful on helicopters which are capable of both forward and backward motion. Examination of the relationship between the leading edges of the pulse train output of AND gate 39 and the ascending transitions of the fore phase-locked loop 33 show that for forward motion the leading edges coincide with the ascending transitions while, for backward motion, the leading edges coincide with descending transitions. By combining the output of pulse generator 51 (which coincides with the ascending transitions) with the output of AND gate 39 in AND gate 63, an output is generated with a polarity that indicates the direction of travel of the helicopter.

The passive microwave velocity sensor shown in FIG. 7 has a bandwidth of 500 MHz. around the 35 GHz. center frequency. Mathmatical analysis shows that this bandwidth does not significantly affect the interference pattern near the center between each pair of antennas. Thus the existence of a finite bandwidth of 500 MHz. does not impair the operation of the radiometric interferometers.

The passive microwave velocity sensor which has just been described senses the along-heading velocity of the aircraft. Drift velocity, i.e., velocity perpendicular to the aircraft's heading, would not be detected by the velocity sensor. By setting up a separate velocity sensor along another axis, (e.g., along the axis of the wing of the aircraft), drift velocity can be sensed. However, the same effect can be achieved more economically by adding a third horn to each interferometer and time sharing the processing electronics.

Figure 8:
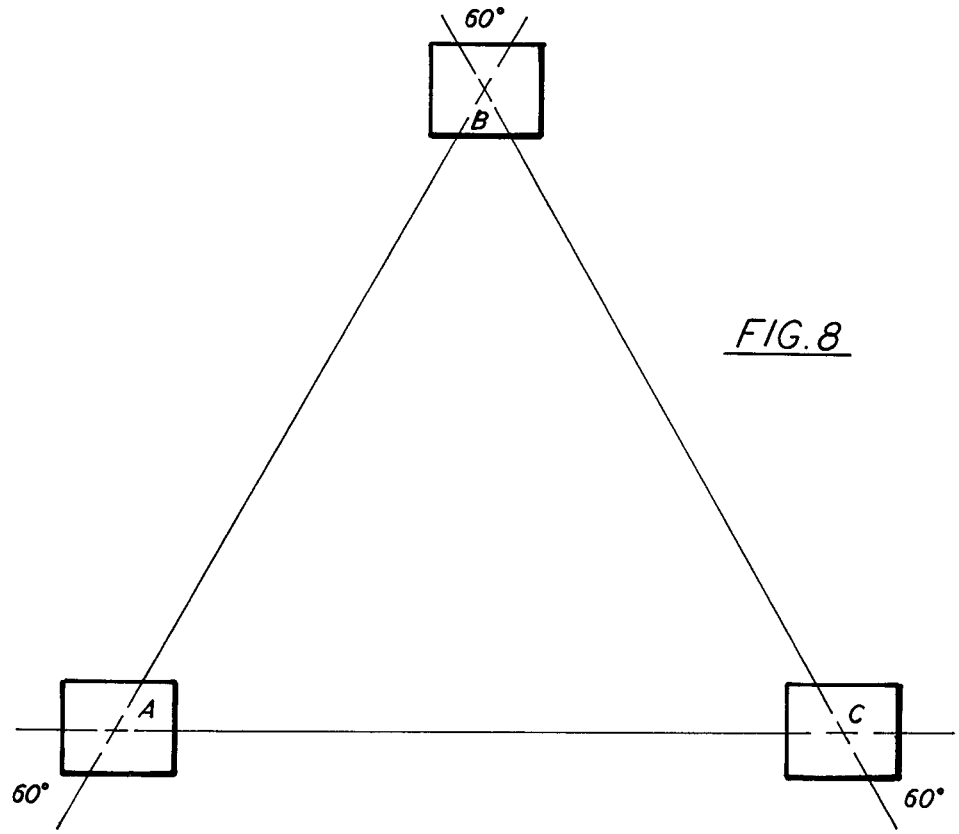
FIG. 8 shows an antenna configuration for use in a passive microwave velocity sensor that senses velocity in two directions.

FIG. 8 shows a configuration for three horn antennas for use in a velocity sensor to determine velocity in two directions. The configuration would be the same for both radiometric interferometers. The three horns may be used as two pairs in three different ways, depending on which horn is common to the two pairs; in this manner any drift angle in a range of 360° may be covered. For the purpose of this description, the horn labelled B in FIG. 8 will be taken to be the common horn and the two pairs will be AB and BC. Assuming that the other interferometer has also been expanded as in FIG. 8, time sharing between pairs would be coordinated so that pairs AB would always be active simultaneously on one half cycle and pairs BC would be active on the other half. At the output of the processing electronics, height would not be affected by the time sharing but velocity, magnitude and direction would apply alternately to the AB and BC components.

Assume that the heading axis of the aircraft bisects angle ABC. Letting

V be the magnitude of the total velocity,
δ be the drift angle,
$V_1$ be the component of velocity directed from A to B,
$V_2$ be the component of velocity directed from C to B,
$V_H$ be the along heading component of velocity and
$V_D$ be the drift component of velocity, the following equations hold:

$$V_1 = V \cos (\delta + \pi/6),$$
$$= V \cos (\delta) \cos (\pi/6) - V \sin (\delta) \sin (\pi/6),$$
$$= V_H(\sqrt{3}/2) - V_D(\tfrac{1}{2});$$
$$V_2 = V \cos (\delta - \pi/6),$$
$$= V \cos (\delta) \cos (\pi/6) + V \sin (\delta) \sin (\pi/6),$$
$$= V_H(\sqrt{3}/2) + V_D(\tfrac{1}{2});$$
$$V_H = (V_2 + V_1)/\sqrt{3} \quad (5)$$
$$V_D = (V_2 - V_1). \quad (6)$$

Thus if velocity along the AB and CB axes is known, along-heading and drift velocities can be computed from equations (5) and (6). If another antenna is used as the common antenna, calculations are done by assuming that the angle bisector is the "heading". Equations (5) and (6) can be generalized to yield $V_H'$, the component of velocity along the assumed "heading" and $V_D'$, the drift velocity from the assumed "heading". The actual along-heading and drift velocity are computed from the following equations:

$$V_H = V_H' \cos \theta - V_D' \sin \theta \quad (7)$$

and $$V_D = V_H' \sin \theta + V_D' \cos \theta, \quad (8)$$

where θ is 120°, 0°, or −120°, depending on whether A, B, or C is the common horn.

The reason for switching from one common horn to another is that motion along a set of interference fringes must be avoided. For example, if horn B in FIG. 8 were the common horn and the drift angle was 60°, then a small, hot source on the ground would not cross any of the interference fringes associated with the BC horn pair. Thus, half of the time (when the BC pair was active) there would be no alternating signal to track and the entire scheme would break down. If the angular deviation of the velocity vector with respect to the angle bisector at the common horn in use were limited to about ±30°, the foregoing problem would never arise. This can be done by continuously computing the ratio $V_D'/V_H'$. Whenever $|V_D'/V_H'|$ exceeded $\tfrac{5}{8}$, it would signify that the generalized drift angle had exceeded ±32° and a new common horn would be selected. The new common horn would be to the right of the previous common horn (e.g. from B to C) if the sign of the ratio were positive and it would move to the left (e.g. from B to A) if the sign were negative. After choosing the common horn, the appropriate value of θ would be selected for use in the coordinate rotation equations.

Figure 9:
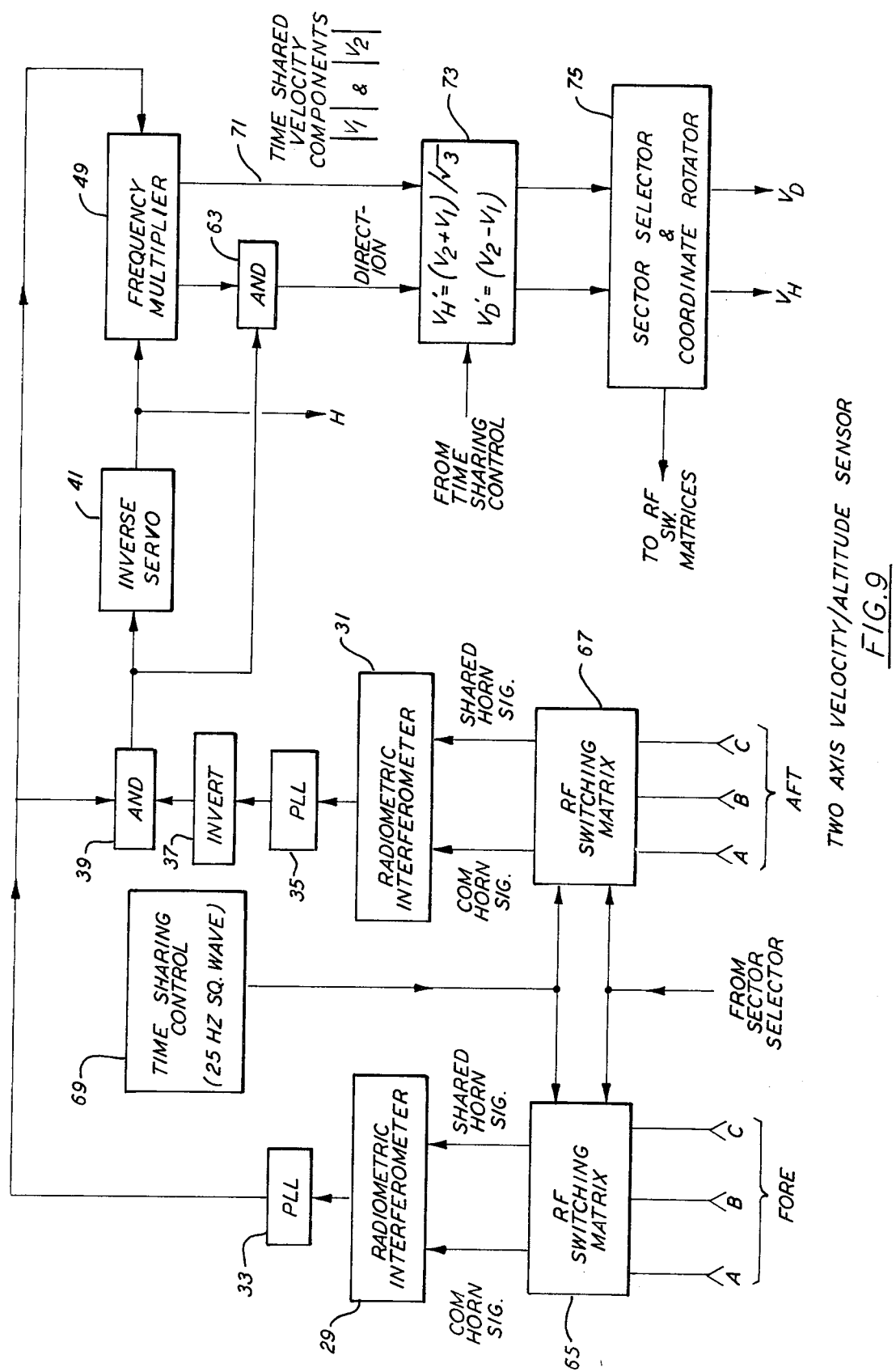
FIG. 9 is a block diagram of a velocity sensor that senses velocity in two directions.

FIG. 9 is a block diagram of a passive microwave velocity sensor designed to implement the foregoing scheme. Many of the components, such as the radiometric interferometers 29 and 31 and the frequency multiplier 49 are the same as in the one-dimensional velocity sensor illustrated in FIG. 7. The input to the radiometric interferometers 29 and 31 is controlled by RF switching matrices 65 and 67. The matrices 65 and 67 designate a common horn and switch between the other two horns. Time sharing control 69 drives matrices 65 and 67 to switch between the other two horns at 25 Hz. The output 71 of frequency multiplier 49 represents the time-shared velocity components $V_1$ and $V_2$ along the axis connecting each pair of horns. Circuit 73 uses output 71 and the output of time sharing control 69 to implement equations (5) and (6) with respect to the assumed "heading". This implementation is done with standard analog circuitry, electronic switches, and sample and hold circuits. Sector selector and coordinate rotator 75 then implements equations (7) and (8) to generate outputs representing along-heading velocity $V_H$ and drift velocity $V_D$. This implementation is also done with standard analog circuitry, electronic switches, and sample and hold circuits. As with the one dimensional velocity sensor, both of these velocity outputs are independent of height. Sector selector and coordinate rotator 75 also checks to see if $|V_D'/V_H'| > \tfrac{5}{8}$ and, if so, sends a signal to the switching matrices 65 and 67 to switch common horns. Having chosen a new common horn, the sector selector and coordinate rotator 75 would also choose a new value of θ to use in implementing equations (7) and (8).

As previously indicated, the satisfactory operation of the radiometric interferometer depends on the existence of variations in ground temperature with wavelengths comparable to the separation between interference fringes in the combined radiation pattern of the antenna pairs. There are other limitations on the operation of the passive microwave velocity sensors shown in FIGS. 7 and 9. Aircraft flexure which would change the distance between horn pairs could impair the accuracy of the sensors. To accurately determine the center frequency of the radiometric interferometer output at moderate and low signal to noise ratios, the phase locked loop employs a smoothing time constant which is several times as large as the correlation time associated with the input signal spectrum. This introduces a delay in response time which is proportional to the ratio of height to velocity, and hence would be long for high altitude, low speed flight. On the other hand, the response time would be short for the low altitudes and high speed characteristic of "nap of the earth" flights. Furthermore, since navigational accuracy depends on ground velocity over a considerable distance (e.g. 100 nautical miles), the navigational accuracy of the system would be high. A final problem concerns ambiguities in altitude readings. In the velocity sensor the altitude is measured as a function of the phase difference between signals received by the radiometric interferometers. The phase difference function is single-valued only for a shift of less than 180°. At low altitudes, the phase shift could exceed 180°, thus introducing an ambiguity into altitude determination. This effect can be ameliorated by mounting additional groups of antennas between the original groups, which would permit a decrease in the distance D between antenna groups, thus decreasing the magnitude of the phase difference. Alternatively, a lower frequency local oscillator (e.g., 18 GHz.) could be employed at low altitudes to increase the separation between interference fringes, which would also decrease the magnitude of the phase difference.

The velocity sensor shown in FIG. 7 and FIG. 9 may be altered by substituting dipole antennas for horn antennas, or changing the frequency of the local oscillator or video amplifier. These and other modifications may be made without departing from the spirit of the invention which is intended to be limited solely by the appended claims.

I claim:

1. A radiometric interferometer for generating a signal proportional to the ratio of ground velocity to altitude by using the natural radiation from terrain received by a first receiving antenna and a second receiving antenna spaced apart from the first receiving antenna a distance such that the combined radiation pattern of the first and second receiving antennas would create a series of interference fringes on the terrain, comprising:
   a) means for generating a summed signal by adding the natural radiation from terrain received by the first and second receiving antennas;
   b) means for generating a subtracted signal by subtracting the natural radiation from terrain received by the first receiving antenna from the natural radiation from terrain received by the second antenna;
   c) means for generating a composite signal by alternately sampling the subtracted signal and the summed signal;
   d) filter means for generating a filtered signal by selecting from the composite signal a particular frequency of natural radiation from terrain; and
   e) means for generating a radiometric interferometer output signal corresponding to the envelope of the amplitude of the filtered signal, said radiometric interferometer output signal being proportional to the ratio of ground velocity to altitude.

2. The radiometric interferometer of claim 1, wherein said means for generating a summed signal and said means for generating a subtracted signal comprise a magic tee with two input ports connected to the first and second receiving antennas, a sum output port, and a difference output port.

3. The radiometric interferometer of claim 2, wherein said means for generating a composite signal comprises:
   a) a radio frequency switch with a first input terminal connected to the sum output port of the magic tee, a second input terminal connected to the difference output port of the magic tee, and an output terminal, and
   b) a square wave generator which drives the switch to alternately connect the first and second input terminals of the switch to the output terminal of the switch.

4. The radiometric interferometer of claim 3, wherein said filter means comprises:
   a) a local oscillator,
   b) a mixer for mixing the signal at the output terminal of the radio frequency switch with the local oscillator signal, and
   c) a video amplifier which amplifies the output of the mixer.

5. The radiometric interferometer of claim 4, wherein said means for generating a radiometric interferometer signal comprises:
   a) a square law detector connected to the output of the video amplifier, and
   b) a phase detector connected to the output of the square law detector and driven by the signal from the square wave generator.

6. A method for using the natural radiation from terrain to generate a signal proportional to the ratio of ground velocity to altitude, comprising:
   a) receiving natural radiation signals from terrain through a first receiving antenna;
   b) receiving natural radiation signals from terrain through a second antenna;
   c) generating a summed signal by adding the natural radiation from terrain received by the first and second receiving antennas;
   d) generating a subtracted signal by subtracting the natural radiation from terrain received by the first receiving antenna from the natural radiation from terrain received by the second receiving antenna;
   e) generating a composite signal by alternately sampling the subtracted signal and the summed signal;
   f) generating a filtered signal by selecting from the composite signal a particular frequency of natural radiation from terrain,
   g) generating a radiometric interferometer output signal corresponding to the envelope of the amplitude of the filtered signal, said radiometric interferometer signal being proportional to the ratio of ground velocity to altitude.

7. A passive microwave velocity sensor for determining ground velocity by using the natural radiation from terrain received by first and second pairs of receiving antennas spaced apart along the direction in which velocity is to be sensed and with the same separation between antennas in both pairs, comprising:
   a) a first radiometric interferometer having a filter frequency for processing signals received by the first pair of antennas;
   b) a second radiometric interferometer for processing signals received by the second pair of antennas, having a filter frequency identical to the filter frequency of the first radiometric interferometer;
   c) means for generating a phase difference signal with a value proportional to the phase difference between the radiometric interferometer output signals of the first and second radiometric interferometers; and d) means for generating a velocity sensor output signal proportional to the ratio of the frequency of the first radiometric interferometer output signal to the value of the phase difference signal, said velocity output signal being proportional to ground velocity and independent of altitude.

8. The passive microwave velocity sensor of claim 7 wherein said means for generating a phase difference signal comprises:
   a) a first phase-locked loop driven by the radiometric interferometer output signal of the first radiometric interferometer to produce as an output a first square wave signal with a frequency identical to the frequency of the radiometric interferometer output signal of the first radiometric interferometer;
   b) a second phase-locked loop driven by the radiometric interferometer output signal of the second radiometric interferometer to produce as an output a second square wave signal with a frequency identical to the frequency of the radiometric interferometer output signal of the second radiometric interferometer;
   c) an inverter for inverting the second square wave signal;
   d) a first AND gate for combining the first square wave signal and the inverter output to generate a pulse train with a duty ratio inversely proportional to altitude; and
   e) an inverse servo for increasing the height of the pulses in the pulse train output of the first AND gate so that the average height of the pulses equals a preset constant, and generating a DC output level equal to the average height of the pulses, thereby generating an inverse servo DC output which is directly proportional to altitude.

9. The passive microwave velocity sensor of claim 8, wherein said means for generating a velocity sensor output signal proportional to the ratio of the frequency of the first radiometric interferometer output signal to the value of the phase difference signal comprises:
   a) a first pulse generator which generates an output signal which is a series of constant amplitude fixed-width pulses coinciding with ascending transitions of the first phase-locked loop, said pulses having a mean voltage proportional to the ratio of ground velocity to altitude;
   b) an analog switch which multiplies the output signal of the first pulse generator by the inverse servo output thereby generating an analog switch output with an average voltage proportional to ground velocity and independent of height;
   c) a second pulse generator for generating a variable frequency pulse train;
   d) an integrator with an input signal equal to the difference between the analog switch output and the output of the second pulse generator; and
   e) a voltage controlled oscillator driven by the voltage of the integrator output and with a VCO output which drives the second pulse generator, said VCO output having a frequency proportional to ground velocity and independent of height.

10. The passive microwave velocity sensor of claim 9, which further comprises means for ascertaining the direction of travel by determining the relationship of the leading edges of the pulse train output of the first AND gate to the transitions of the first square wave output.

11. The passive microwave velocity sensor of claim 10, wherein the means for ascertaining the direction of travel comprises a second AND gate which combines the outputs of the first pulse generator and the output of the first AND gate to generate a voltage with a polarity that indicates the direction of travel.

12. A drift-sensing passive microwave velocity sensor for determining ground velocity by using the natural radiation from terrain received by first and second triads of receiving antennas spaced apart from each other and both arranged in an equilateral triangle of identical dimensions, comprising:
   a) a first radiometric interferometer;
   b) a first RF switching matrix for selecting a common antenna from the first triad and switching between the remaining two antennas in the first triad to select two antennas for processing by the first radiometric interferometer;
   c) a second radiometric interferometer;
   d) a second RF switching matrix for selecting a common antenna from the second triad and switching between the remaining antennas in the second triad to select two antennas for processing by the second radiometric interferometer;
   e) a time sharing control for directing the first and second RF switching matrices to periodically alternate between the two non-common antennas in each triad;
   f) phase difference means for generating a phase difference signal with a value proportional to the phase difference between the radiometric output signals of the first and second radiometric interferometers;
   g) velocity sensor means for generating a time-shared ground velocity output signal proportional to the ratio of the frequency of the first radiometric interferometer output signal to the value of the phase difference signal;
   h) direction sensor means using the relationship of the first radiometric interferometer output signal and the phase difference signal to generate a direction signal with a polarity proportional to the direction of travel;
   i) velocity computation means using the direction signal and the time-shared ground velocity output signal to generate a relative heading velocity and relative drift velocity output; and
   j) sector selection means using the relative heading velocity output and relative drift velocity output to generate a true heading velocity output and a true drift velocity output and to direct the first and second RF switching matrices to change common horns if the drift angle exceeds thirty degrees with respect to the angle bisector at the common horn.

13. A method for using the natural radiation from terrain to generate a signal proportional to ground velocity and independent of height, which comprises:
   a) receiving natural radiation from terrain through a first pair of receiving antennas with a combined radiation pattern that would generate a series of interference fringes on the terrain;
   b) receiving natural radiation from terrain through a second pair of receiving antennas spaced apart from the first pair of receiving antennas and having a combined radiation pattern that would generate a series of inteference fringes on the terrain with a separation equal to the separation between interference fringes in the combined radiation pattern of the first pair of receiving antennas;

c) generating a first radiometric interferometer signal with a frequency proportional to the speed at which sources of natural radiation from terrain pass through the inteference fringes of the combined radiation pattern that would be generated by the first pair of receiving antennas, said first radiometric interferometer signal being proportional to the ratio of ground velocity to height;

d) generating a second radiometric interferometer signal with a frequency proportional to the speed at which sources of natural radiation from terrain pass through the interference fringes of the combined radiation pattern that would be generated by the second pair of receiving antennas;

e) generating a phase delay signal proportional to the phase delay between the first and second radiometric interferometer signals, said phase delay signal being inversely proportional to height; and f) dividing the first radiometric interferometer signal by the phase delay signal to generate a velocity sensor output signal, said velocity sensor output signal being proportional to ground velocity and independent of height.

* * * * *